Figure 1:
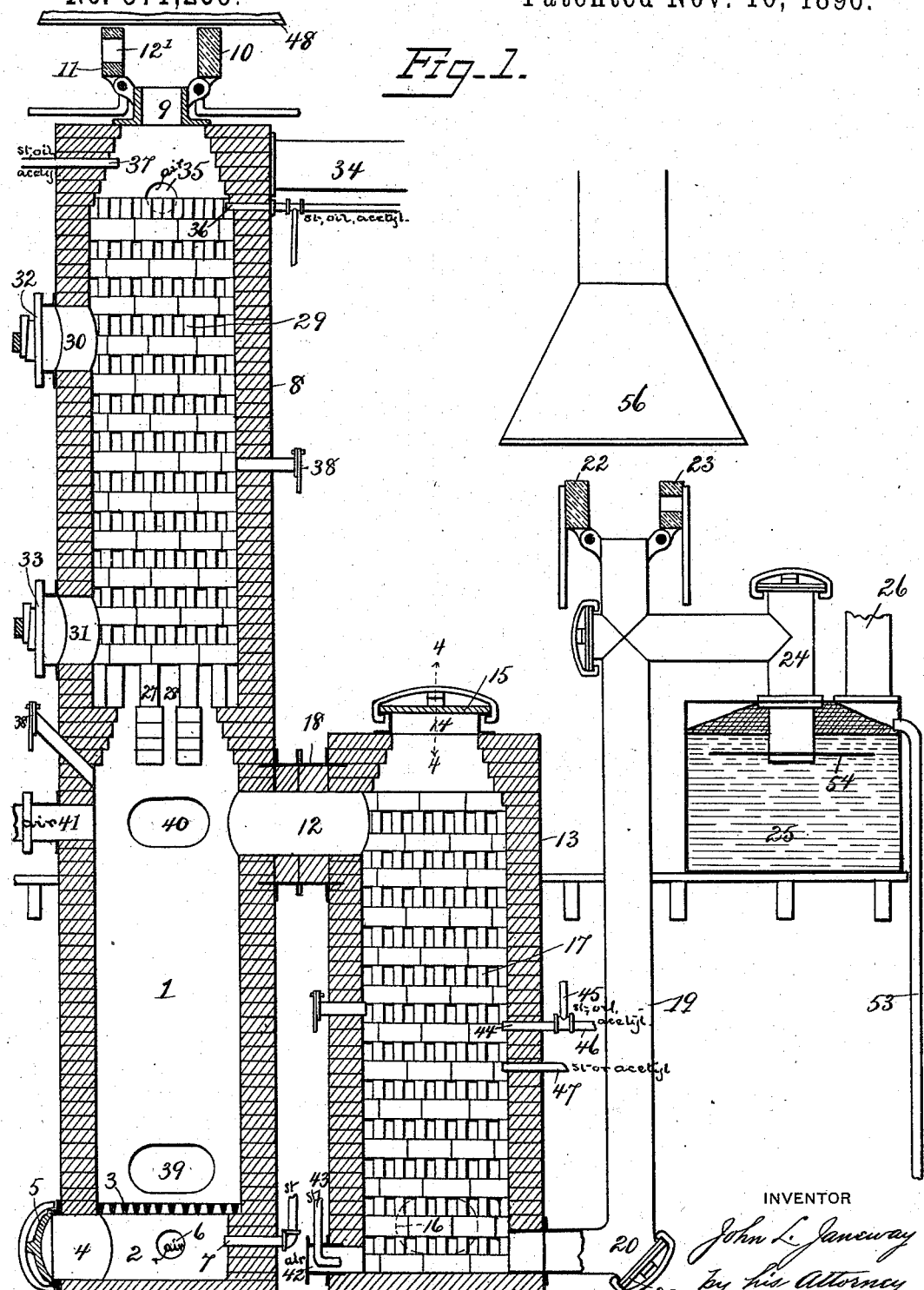

(No Model.) 3 Sheets—Sheet 1.

J. L. JANEWAY, Dec'd.
P. W. Janeway & T. L. Hodge, Administrators.
PROCESS OF MANUFACTURING GAS.

No. 571,269. Patented Nov. 10, 1896.

WITNESSES. Albert Popkins. Carrie L. Acker.

INVENTOR
John L. Janeway
by his Attorney
Jas. L. Skidmore (No Model.) 3 Sheets—Sheet 2.
J. L. JANEWAY, Dec'd.
P. W. JANEWAY & T. L. HODGE, Administrators.
PROCESS OF MANUFACTURING GAS.
No. 571,269. Patented Nov. 10, 1896.
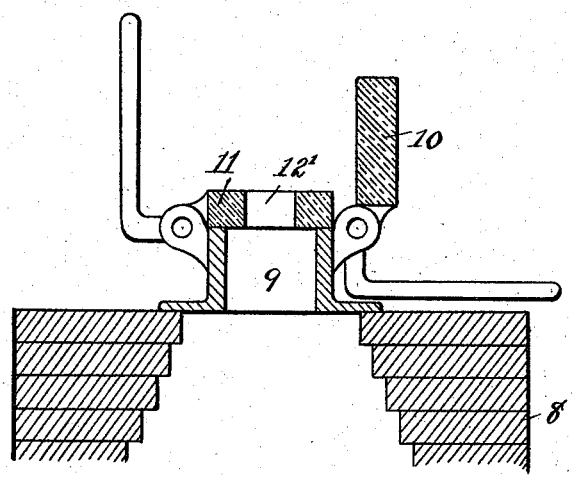
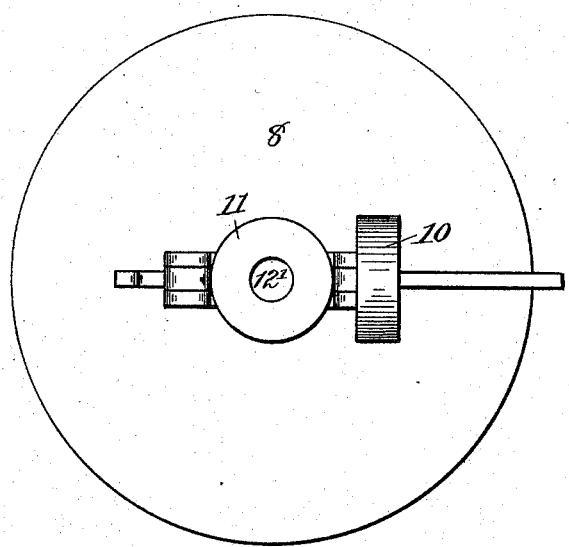

(No Model.)    J. L. JANEWAY, Dec'd.    3 Sheets—Sheet 3.
P. W. Janeway & T. L. Hodge, Administrators.
PROCESS OF MANUFACTURING GAS.
No. 571,269.    Patented Nov. 10, 1896.
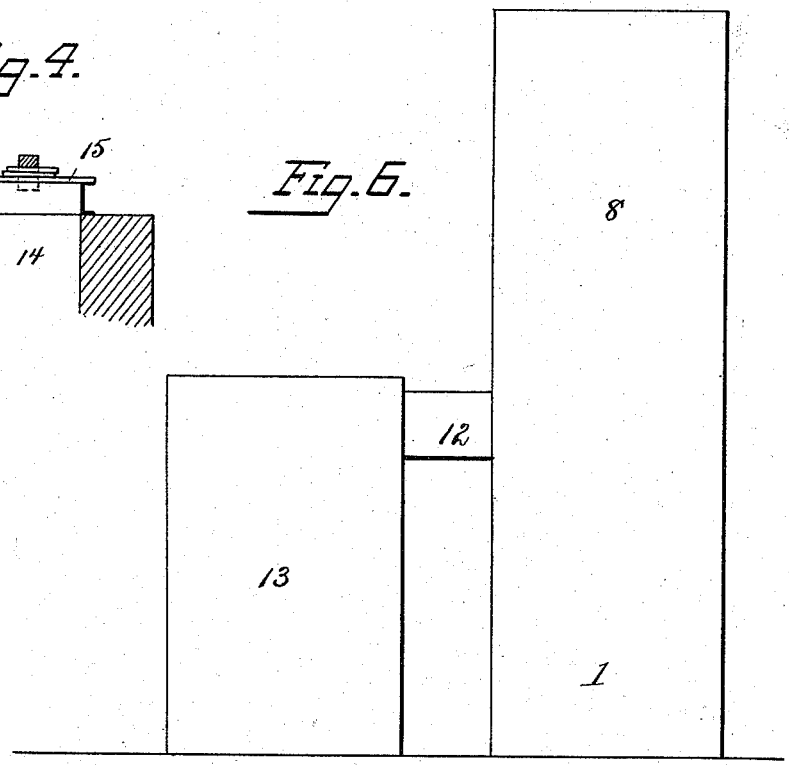

United States Patent Office.

JOHN L. JANEWAY, OF OAKS, PENNSYLVANIA; PRICE W. JANEWAY AND THOMAS L. HODGE, ADMINISTRATORS OF SAID JOHN L. JANEWAY, DECEASED, ASSIGNORS TO THE PHOENIX GAS AND IMPROVEMENT COMPANY, OF PHILADELPHIA, PENNSYLVANIA.

PROCESS OF MANUFACTURING GAS.

SPECIFICATION forming part of Letters Patent No. 571,269, dated November 10, 1896.

Application filed December 31, 1895. Serial No. 573,878. (No specimens.)

*To all whom it may concern:*

Be it known that I, JOHN L. JANEWAY, a citizen of the United States, residing at Oaks, in the county of Montgomery and State of Pennsylvania, have invented certain new and useful Improvements in Processes of Manufacturing Gas; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in the art of making gas; and it consists in the improved process hereinafter specifically set forth, whereby acetylene is combined effectively with water-gas and steam to provide a fixed gas possessing high qualities as an illuminant or for heating purposes.

While I have illustrated in the drawings a form of apparatus which is well adapted for the carrying out of my process, I do not in this application for Letters Patent make claim for the novel construction of such apparatus, for the reason that the same constitutes the subject-matter of another application for Letters Patent filed by me under date of August 27, 1895, Serial No. 560,660. Moreover, my improved process as hereinafter disclosed is not necessarily confined in its practice to the use of any specific form or construction of apparatus beyond the general features required for effecting the several steps to be described.

In the drawings, Figure 1 is a sectional elevation of an apparatus adapted for carrying out my process. Fig. 2 is a sectional elevation, on a larger scale, of one of the outlet-valves. Fig. 3 is a plan view of Fig. 2. Fig. 4 is a section on the line 4 4 of Fig. 1, and Figs. 5 and 6 are elevations of modified forms of the apparatus.

The reference-numeral 1 indicates the main combustion-chamber of the apparatus, lined with refractory material, and having an ash-pit 2, a grate 3, an opening 4, through which ashes may be removed, and a door 5. An air-pipe 6 and a steam-pipe 7 are also provided below the grate 3.

The walls of the chamber 1 are continued upward sufficiently to form a chamber 8, and the fire-brick lining is narrowed at the top to form an outlet 9 for the products of combustion, and provided with two hinged valves 10 and 11, either of which may be used to close the opening 9.

Adjacent to the chamber 1, and connected therewith by a closed passage 12, is a fixing-chamber 13, having an upper manhole 14, closed by a cover 15. At the bottom of the chamber 13 is a door 16, adapted, in connection with the manhole 14, to permit the chamber to be supplied with checkerwork fire-brick 17, as shown. This checkerwork is so arranged as to allow a free passage therethrough of products of combustion, gases, &c. The passage 12 is lined with fire-brick to avoid undue heating of its metallic shell 18 and to prevent loss of heat by radiation. From the lower end of the chamber 13 a pipe 19 extends upwardly and is provided with an elbow 20, closed by a door 21. The upper end of the pipe 19 is provided with two valves 22 and 23, either of which may be employed to close said pipe. From the pipe 19, at a point below the upper end, a branch pipe 24 extends to a wash-box 25, the latter being provided with a pipe 26, through which gas may pass to a condenser, purifier, or gas-holder.

At the upper end of the chamber 1, where it joins the chamber 8, the fire-brick are set closer to the center of the chamber to form an open archway to support a series of transversely-disposed fire-bricks 27, so arranged as to leave between them a series of passages 28 to permit the free flow of the products of combustion or of the gases generated in the chambers 1, 8, or 13. This layer of fire-brick 27 serves to support checkerwork 29 within the chamber 8, which is inserted and renewed through openings 30 and 31, closed by doors 32 and 33.

An escape-pipe 34 extends from the upper end of the chamber 8 to the wash-box 25 or to a separate wash-box. An air-pipe 35 and inlets 36 and 37 for steam and acetylene are also provided at the upper end of the chamber 8, or steam may be admitted through inlet 37 and steam and acetylene through inlet 36 into said chamber 8. Suitable sight-cocks 38 are also provided at convenient points to permit a view into the chambers.

The main chamber 1 is provided with one or more stoke-doors 39 and an opening 40, through which carbonaceous material is fed to the chamber on curved sinker-bars introduced to settle the coke in the chamber 1.

At a point diametrically opposite the passage 12 the chamber 1 is provided with a blast-pipe 41, through which a blast of air may be forced to intermingle with the gases generated in the chamber 1 and to support combustion in the chambers 8 and 13, so as to store heat in the checkerwork in said chamber, and, further, to act, when necessary, to force the gases generated in chambers 1 and 8 through the passage 12, down through the chamber 13, and out through the pipe 19.

At the lower end of the chamber 13 are arranged an air-pipe 42 and a steam-pipe 43, so that a jet of either air or steam or a jet of mingled air and steam may be injected into the chamber. At about midway its height the chamber 13 is also provided with an inlet-pipe 44, having independent connections 45 and 46 for acetylene and steam or oil and steam. Also, if desired, a supplemental inlet 47 may be provided for acetylene or steam.

Above the passage or chamber 8 is suspended a suitable stack 48, through which the products of combustion escape, and as the operation of the parts will at times require either a partial or entire closing of the escape-passage 9 of the chamber 8 two valves 10 and 11 are employed, the valve 11 having a central opening 12', so as to limit the quantity of gas which may escape, while the valve 10 is a solid imperforate valve to wholly close the opening 9. The valves 22 and 23 of the pipe 19 are similar in construction to the valves 10 and 11 and are similarly operated, so that the escape of the products of combustion may be regulated through both passages.

The door 21 of the pipe 19 is designed to permit the cleaning of soot from the chamber 13.

The wash-box 25 is provided with an overflow-pipe 53, a deflector-plate 54, and gas-escape pipe 26, leading to any suitable holder.

In the process of manufacturing an illuminating-gas the chamber 1 is filled with a quantity of carbonaceous material, such as anthracite or bituminous coal, coke, culm, or slack. The outlet 9 is opened and the valves on the upper end of the pipe 19 are closed, so that all of the products of combustion must necessarily pass up through the checkerwork in chamber 8 and escape through the outlet 9. The fire having been started, the air-blast pipe 6 at the bottom of the chamber 1 is opened and a sufficient quantity of air is admitted to support combustion in the chamber 1, perfect combustion taking place up to the clinker-line of the chamber—say about two feet, more or less, above the grate-bars, according to the depth of the fuel and the size of the chamber. Above the clinker-line the coal or other carbonaceous material is subjected to destructive distillation, and the gases thus formed meet an incoming blast of air forced through the pipe 41 and burn up through the checkerwork fire-brick or other refractory material in the chamber 8 until it is sufficiently heated.

The valve 11, having the central opening 12', is then closed, so that only a small quantity of the products of combustion may pass through the escape-stack 48, and the valves on top of the pipe 19 are opened to permit the passage of the products of combustion through the passage 12 and through the chamber 13, and from thence out through the pipe 19 to the stack 56; or the valve 10 may be closed, so that all the products of combustion may pass through the chamber 13 and heat said chamber to the desired degree of heat. The blast of air admitted through the pipe 41 directs the products of combustion through the passage 12 and consumes the gases in its passage through the checkerwork fire-brick in chamber 13 to impart to it the desired heat.

After the chambers have been heated to the desired point the process of manufacturing gases is commenced, the gases being produced in the producing-chambers 1 and 8 and conducted through the passage 12 to the fixing-chamber 13, and from thence to the wash-box.

In starting the operation, all valves and escapes being closed, the steam-blast 7 in the bottom of the chamber 1 is opened and the desired amount of steam admitted. One or more of the pipes 36 and 37 at top of chamber 8 are opened, and the escape-passage 19 leads then directly to the wash-box 25.

The steam, entering the lower portion of the chamber 1 from the blast-pipe 7, passes up through the mass of incandescent carbon in the chamber 1 and is decomposed, forming a so-called "water-gas," consisting of carbonic oxid and free hydrogen.

The acetylene and steam forced into the chamber 8 through the pipes 36, and, if necessary, through the additional pipe 37, are forced down through the highly-heated checkerwork fire-brick or other refractory material in the chamber 8, the steam acting as a forcing medium to force the gas down through the chamber, while the steam is practically decomposed in its passage down through chamber 8, and, meeting the highly-heated water-gas at top of chamber 1, the decomposed steam takes up sufficient carbon to form a water-gas.

The two bodies of gases formed in the chambers 1 and 8 meet at a point opposite the passage 12 and intermingling pass down through the highly-heated refractory material in the chamber 13 and become fixed, the gases finally escaping through the pipes 19 to the wash-box in the form of a fixed gas composed of a mixture of water-gas, acetylene, and carbureted hydrogen.

This process of manufacturing gas is continued until the heat of the chambers is reduced and another heat is blown up, when, all the valves being again closed, air-blast 6 in lower portion of chamber 1, escape 9 at upper end of chamber 8, and air-blast 42 at lower end of chamber 13 are opened. The operation in chamber 1 is the same as previously described, the gases arising from the destructive distillation of the coal or other carbonaceous material burning up through the chamber 8. The chamber 13, owing to its much higher heat, due to the passage of heated gas during the fixing process, highly heats the air entering through the air-blast 42, and this highly-heated blast of air passes through the passage 12 and mingles with the gases produced in chamber 1, supporting combustion in the chamber 8 and heating the refractory material in the latter. After the chambers have been heated to the desired point the various valves are closed and steam-jet 7 in the lower portion of chamber 1 is opened to form a water-gas, as previously described. The acetylene and steam-jets 45 and 46, and, if necessary, the additional steam-jet 47, or the steam-jet 43 in chamber 13, are opened and the acetylene and steam admitted are forced upwardly through the highly-heated checkerwork firebrick or other refractory material in the chamber 13, while the steam, when it reaches the upper end of the chamber, is practically decomposed and takes up sufficient carbon to form a water-gas on its entrance into top of chamber 1. The two bodies of gas formed in the chambers 1 and 13 meet at the passage 12 and intermingling pass up through the highly-heated refractory material in the chamber 8 and become fixed, and from thence finally escape through the passage 34 to a wash-box or holder. This process is kept up until the heat of the chambers is reduced, when another heat is blown up, and the same operation takes place as was first described, making the runs of gas alternately down and up and using the chambers 13 and 8 alternately as fixing-chambers, the last-used fixing-chamber yielding up its surplus of heat to form a hot blast, which is found highly advantageous and economical in the burning of the gases and the heating up of the chambers, while at the same time sufficient heat is retained to enable the chamber to vaporize the injected oil and act as a gas-producing chamber.

The steam introduced at the same time with the acetylene serves to keep the latter from flashing into lamp-black. As the acetylene passes through the highly-heated checkerwork it is expanded and the molecules of carbon are divided and broken up. When in this state, it meets and mingles with the water-gas from the chamber 1, and they together pass through the checkerwork in the superheating or fixing chamber and become a thoroughly-fixed gas which will not stratify in the holder, as would be the case if the acetylene and water-gas were mixed together while cold, the specific gravity of the acetylene being about twice as heavy as that of coal-gas.

When acetylene is used in liquid form, I prefer to introduce it into the chambers 8 and 13 at about the center of the chambers, but if used in the gaseous form it is preferable to introduce it with steam at either the upper or lower end thereof, as the case may be.

I may employ acetylene in either liquid or gaseous form and find that it greatly enriches the water-gas.

Having thus described my invention, what I claim is—

1. The herein-described process of manufacturing gas, said process consisting in first manufacturing a water-gas; second, heating a mixture of acetylene and steam to produce a gaseous vapor; third, intermingling said gaseous vapor with the hot water-gas, and, finally, passing the mingled gases through a body of heated refractory material.

2. The herein-described process of manufacturing gas, said process consisting in, first, heating a body of carbonaceous material to incandescence; second, passing therethrough a jet of steam to produce a gas; third, passing a mingled quantity of steam and acetylene through a body of heated refractory material to produce a fixed gas that will not stratify in the holder after being manufactured; fourth, intermingling the two gases, and, finally, passing the mingled gases through a second body of heated refractory material to fix the gas.

3. An improvement in the art of producing gas, consisting in intermingling a gas generated from acetylene and steam with a water-gas, and conveying the intermingled gases to a fixing-chamber to convert them into a fixed gas, substantially as described.

4. An improvement in the art of producing gas, consisting in heating acetylene and steam, intermingling the heated acetylene and steam with a water-gas, and finally, further heating the combined acetylene, steam and water-gas, substantially as described.

In testimony whereof I affix my signature in presence of two witnesses.

JOHN L. JANEWAY.

Witnesses:
FRANCIS P. MALONE,
P. W. JANEWAY.